United States Patent
Gaiser

(10) Patent No.: US 9,005,533 B2
(45) Date of Patent: Apr. 14, 2015

(54) PCM DEVICE AND CATALYTIC CONVERTER

(75) Inventor: Gerd Gaiser, Reutlingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 219 days.

(21) Appl. No.: 13/570,766

(22) Filed: Aug. 9, 2012

(65) Prior Publication Data

US 2013/0209322 A1  Aug. 15, 2013

(30) Foreign Application Priority Data

Aug. 10, 2011 (DE) .................. 10 2011 080 782

(51) Int. Cl.
| | | |
|---|---|---|
| *B01D 50/00* | (2006.01) | |
| *B01D 53/94* | (2006.01) | |
| *F01N 3/28* | (2006.01) | |
| *F28D 20/02* | (2006.01) | |
| *F28F 3/04* | (2006.01) | |
| *F28D 9/00* | (2006.01) | |
| *F28D 20/00* | (2006.01) | |

(52) U.S. Cl.
CPC .............. *B01D 53/94* (2013.01); *F01N 3/2814* (2013.01); *F01N 3/2889* (2013.01); *F01N 2240/10* (2013.01); *F28D 9/0037* (2013.01); *F28D 20/02* (2013.01); *F28D 2020/0008* (2013.01); *F28F 3/046* (2013.01); *Y02E 60/145* (2013.01)

(58) Field of Classification Search
CPC . F01N 3/2006; F01N 3/2882; F01N 2330/06; F01N 2570/14; F01N 3/0814; F01N 3/0821; F01N 3/2814; F28F 3/046; F28D 2020/0008
USPC ...................................... 422/177, 180; 55/523
See application file for complete search history.

(56) References Cited

U.S. PATENT DOCUMENTS

| | | | |
|---|---|---|---|
| 5,340,020 A | 8/1994 | Maus et al. | |
| 6,207,116 B1 * | 3/2001 | Heed | 422/173 |
| 6,720,060 B1 * | 4/2004 | Swars | 428/116 |
| 7,468,166 B2 * | 12/2008 | Gaiser | 422/180 |
| 2003/0213242 A1 | 11/2003 | Jobson | |
| 2004/0187456 A1 * | 9/2004 | Bruck | 55/487 |
| 2006/0196632 A1 | 9/2006 | Kudo | |
| 2007/0056712 A1 | 3/2007 | Yu et al. | |
| 2011/0016847 A1 | 1/2011 | Gaiser | |
| 2011/0048388 A1 | 3/2011 | Takahashi et al. | |
| 2012/0117956 A1 | 5/2012 | Gaiser | |

FOREIGN PATENT DOCUMENTS

| | | |
|---|---|---|
| DE | 39 20 159 A1 | 1/1991 |
| DE | 601 22 189 T2 | 3/2007 |
| DE | 102004052106 B4 * | 1/2008 |
| DE | 102009034654 A1 | 1/2011 |

(Continued)

*Primary Examiner* — Tom Duong
(74) *Attorney, Agent, or Firm* — McGlew and Tuttle, P.C.

(57) ABSTRACT

A PCM device (1) is provided for an exhaust system of an internal combustion engine, especially of a motor vehicle. A simplified installation of the PCM device (1), with reduced heat stresses, is achieved through the provision of at least one storage plate (2), which has two plate bodies (3, 4), which follow each other, enclose a storage space (7) filled with heat storage material (18) and have a wave structure (5, 6) each. The wave structure (5) of one plate body (3) extends sloped in relation to the wave structure (6) of the other plate body (4).

15 Claims, 7 Drawing Sheets

(56) References Cited

FOREIGN PATENT DOCUMENTS

| | | |
|---|---|---|
| DE | 102009034655 A1 | 1/2011 |
| EP | 2 177 255 A1 | 4/2010 |
| EP | 2 282 154 A1 | 2/2011 |
| JP | 04-73595 A | 3/1992 |
| JP | 7-77393 A | 3/1995 |
| JP | 2006-226628 A | 8/2006 |
| JP | 2011-52919 A | 3/2011 |
| WO | 2010/139772 A2 | 12/2010 |
| WO | 2011/094371 A2 | 8/2011 |

* cited by examiner

PCM DEVICE AND CATALYTIC CONVERTER

CROSS REFERENCE TO RELATED APPLICATIONS

This application claims the benefit of priority under 35 U.S.C. §119 of German Patent Application DE 10 2011 080 782.9 filed Aug. 10, 2011, the entire contents of which are incorporated herein by reference.

FIELD OF THE INVENTION

The present invention pertains to a phase change material (PCM) device for an exhaust system of an internal combustion engine, especially of a motor. The present invention pertains, in addition, to a catalytic converter equipped with such a PCM device.

BACKGROUND OF THE INVENTION

A PCM device, in which a plurality of plate bodies are in contact with one another and have a wave structure each, is known from DE 10 2009 034 655 A1. Mutually adjacent plate bodies are aligned with one another in this case such that their wave structures extend in parallel to each other. The waves of the wave structure of one plate body in the area of wave troughs can touch each other as a result linearly in the area of the wave crests of the waves of the wave structure of the other plate body. The plate bodies can be tightly fastened to one another, e.g., by means of welded seams, along these linear contact sites. As a result, a plurality of duct-shaped storage spaces, which are arranged next to each other and can be filled with heat storage material each, can be formed between two adjacent plate bodies.

A phase change material is preferably used as the heat storage material in a PCM device in order to make it possible to storage a comparatively large amount of heat latently in the range of the phase change temperature. There usually is a change in the volume of the heat storage material during phase change. This material usually expands during the melting of the heat storage material. There is now a risk of damage to the PCM device. For example, it shall be ensured that the heat supply does not take place during the melting of the heat storage material such that an area of the heat storage material will melt first, which is enclosed by the still solid heat storage material melting later or that the expansion of this material is blocked. Depending on the configuration of the PCM device, the respective installation situation must therefore be taken into account.

It is known, in principle, from DE 10 2009 034 654 A1 that additional storage volume is made available within the PCM device for the heat storage material, so that a sufficient volume is available for the expansion of the heat storage material.

SUMMARY OF THE INVENTION

An object of the present invention is to provide a PCM device of the type mentioned in the introduction, or for a catalytic converter equipped therewith an improved embodiment, which is characterized especially in that the risk of heat stresses is reduced. Furthermore, a high rate of heat transmission is desired in order to make it possible to absorb and release heat.

The present invention is based on the general idea of equipping the PCM device with at least one storage plate, wherein the respective storage plate comprises only two plate bodies each, which enclose a single storage space filled with heat storage material and have a wave structure each. The plate bodies are aligned with one another within the respective storage plate such that the wave structure of one plate body extends sloping in relation to the wave structure of the other wave body. That is the wave structure of one plate body is at an angle with respect to the wave structure of another adjacent plate body (and the angle is not zero). As a result, essentially only punctiform contacts are obtained on the sides of the two plate bodies facing each other of the respective storage plate along the wave structures, as a result of which a single, common and contiguous storage space is formed between the two plate bodies of the respective storage plate. Since the two plate bodies extend differently in space in terms of their wave structure, improved possibilities are obtained for the installation of the storage plate and hence for the installation of the PCM device equipped therewith. In particular, the plate bodies of the respective storage plate can expand elastically quasi in all directions in space based on the differently sloped wave structures without excessive structural stresses developing within the storage plate.

The respective wave structure may preferably have a plurality of waves extending in parallel to one another, which follow each other in a longitudinal direction of the wave structure and extend in a transverse direction of the wave structure extending at right angles to the longitudinal direction.

The respective plate body may advantageously have a rectangular shape, as a result of which, for example, a housing for accommodating one or more plate bodies can be manufactured in an especially simple manner. The rectangular plate body has a longitudinal direction and a transverse direction at right angles thereto.

In wave structures extending sloped in relation to one another in the two plate bodies within the storage plate, the longitudinal direction of the corresponding wave structure may extend within the respective plate body with a slope in relation to the longitudinal direction of the respective plate body. For example, the longitudinal directions of the wave structure and of the plate body may extend with a slope of about 45° in relation to one another.

Especially preferable is a configuration in which the longitudinal directions of the two plate bodies within the respective storage plate extend in parallel to one another, whereas the longitudinal directions of the two corresponding wave structures extend with a slope in opposite directions relative to the longitudinal directions of the plate bodies. A symmetrical arrangement is preferred in this case. For example, the longitudinal direction of one wave structure may be sloped by +45° in relation to the longitudinal directions of the two plate bodies, whereas the longitudinal direction of the other wave structure is sloped by −45° in relation to the longitudinal directions of the two plate bodies. On the whole, the longitudinal directions of the two wave structures are now sloped by about 90° in relation to one another.

The respective wave structure may have circular arc-shaped waves or sinusoidal or trapezoidal waves or triangular waves in cross section.

Mainly metals or metal alloys are suitable materials for the plate bodies. The respective plate body is preferably formed by a correspondingly selected sheet metal body.

A phase change material is preferably used as the heat storage material in the PCM device according to the present invention as well.

According to an advantageous embodiment, the plate bodies may have within the storage space a plurality of contact sites, in which bodies are in contact with one another, wherein the plate bodies may be fastened to one another in a plurality of contact sites or all contact sites. For example, soldered connections or welded connections can be embodied at the contact sites. Depending on the cross-sectional profile of the waves of the wave structures, the contact sites are preferably punctiform. However, linear or flat contact sites are also conceivable, in principle. However, it is essential that the plate bodies touch each other via a plurality of such singular contact sites and not via elongated, contiguous, linear contact areas, which extend over the entire width of a wave measured in the transverse direction. The contact sites rather extend only over a relatively small area in the transverse direction of the respective wave in the preferred embodiment of the PCM device according to the present invention being shown here.

According to another advantageous embodiment, at least two storage plates may be provided within the PCM device, and said storage plates are arranged one on top of another to form a plate stack, wherein a flow path is formed between adjacent storage plates. It is possible through the flow path to supply heat to the PCM device or to remove or absorb heat from the PCM device via a fluid flow, especially gas flow, preferably exhaust gas flow, which is sent through the flow path.

The plate bodies laterally defining the respective flow path may be designed in terms of their wave structures, in principle, such that the wave structures extend in parallel to one another, so that the respective flow path is formed by a plurality of individual ducts extending in parallel to one another. However, preferred is an embodiment in which in which the wave structures of the plate bodies of the adjacent storage plates, which said wave structures laterally define the respective flow path, extend sloped in relation to one another. The respective flow path will have as a result a similarly fissured structure as the storage space within the respective storage plate, which means frequent changes in direction and hence turbulence and intense heat transfer for the respective fluid flow.

The longitudinal directions of rectangular plate bodies of adjacent storage plates may preferably extend in parallel to one another, whereas there are sloped wave structures within the flow path opposite the longitudinal directions of the plate bodies.

The longitudinal directions of the plate bodies, which directions are oriented in parallel to one another, now define a longitudinal direction of the flow path, which can also be called the main flow direction in the flow path. In other words, the wave structures laterally defining the flow path are sloped in opposite directions relative to the longitudinal direction of the flow path, as a result of which multiple deflections are imposed on the fluid flow, which facilitates the heat transmission between the fluid flow and the storage plates.

According to an advantageous embodiment, the plate bodies of the adjacent storage plates may have within the flow path a plurality of contact sites, at which bodies are in contact with one another, and the plate bodies are fastened to one another in a plurality of contact sites or in all contact sites, as a result of which adjacent storage plates are fastened to one another within the plate stack.

Corresponding to another advantageous embodiment, the respective flow path may be defined laterally by side walls, which extend from an open inlet of the flow path to an open outlet of the flow path of the plate stack. The main flow direction of the flow path is defined hereby. If more than two such plates are present within the plate stack, the main flow directions of the flow paths are aligned in parallel to one another by the side walls.

Especially preferable is a variant in which the side walls are formed by bent and mutually overlapping side edges of the storage plates. These side edges may form linear, preferably flat contact zones, in which the side edges touch each other to form the side walls and in which the side edges may be fastened to one another. Suitable fastening may be embodied, for example, by soldering or welding.

At least one of the plate bodies may have a catalytically active coating on a surface facing away from the storage space in an especially advantageous embodiment. If a plurality of plate bodies are provided for forming a plate stack, at least one surface defining the flow path may be provided with such a catalytically active coating. It is possible as a result to integrate the functionality of a catalytic converter in the PCM device. This leads, in particular, to a simplification of a catalytic converter with a PCM device integrated therein.

According to an especially advantageous embodiment, a capillary structure, preferably in the form of a separate, additional component, which extends along a plurality of or all waves of the wave structures of the two plate bodies, may be arranged in the storage space of the respective storage plate. Such a capillary structure brings about the most uniform distribution possible of the liquid heat storage material in the entire storage space in the liquid phase of the heat storage material, which is designed as a phase change material in this case. If solidification, i.e., phase change, will then occur because of cooling, the heat storage material solidifies distributed essentially uniformly within the storage space. As a result, a sufficient expansion volume is available essentially everywhere within the storage space after solidification of the heat storage material, and this expansion volume can take up the expanding heat storage material during a later, repeated liquefaction of the heat storage material, without undesired stresses developing within the structure of the storage plate.

Such capillary structures may be embodied, for example, by means of fibrous mats or nonwoven mats. Network structures and foam bodies made of ceramic or metals are conceivable as well.

According to another advantageous embodiment, the respective storage plate may have a closed circumferential edge, in which the plate bodies are flatly in contact with one another and are fastened to one another. For example, soldering and welding methods are likewise suitable here. The individual storage plates can be manufactured due to this mode of construction with a storage space sealed towards the outside in an especially simple manner.

The storage plates preferably have essentially a flat configuration. A mode of construction in which the aforementioned edge is located in a contact plane, which simplifies the assembly of the storage plates, is especially advantageous. Relative to this contact plane, the wave structures of the two plate bodies may project in opposite directions. For example, the wave structure of one plate body is located exclusively on one side of the contact plane, while the wave structure of the other plate body is located exclusively on the other side of the plate plane. It is clear that the wave structures may touch each other in the plate plane in order to form the aforementioned contact sites within the storage space.

The wave ends, i.e., the transverse ends of the individual waves, may be shaped such that they come to a stop at the edge or towards the edge. The plate bodies may be manufactured, for example, by cutting out of a wavy web material provided in a quasi endless form. Only the circumferential edge areas may then possibly have to be prepared by means of reshaping. It is also possible otherwise to cut the plate bodies out of a flat web material provided in a quasi endless form, into which the respective wave structure is then introduced by means of a reshaping technique, e.g., deep drawing.

The respective storage plate may have at least one filling opening in order to make it possible to introduce the heat storage material into the storage space after joining the plate bodies. The heat storage material designed as a phase change material may be filled into the storage space in a solid state, for example, as a free-flowing granular material or powder, or in the liquid state. For example, the respective storage plate may have a filling opening located at the bottom or liquid heat storage material and a vent opening located at the top. The respective filling opening may be closed permanently in a gas-tight manner after introduction of the heat storage material.

Especially advantageous is an embodiment in which the plate bodies used to manufacture the respective storage plate are designed as identical parts, which can be manufactured separately and connected to one another to form the respective storage plate.

It is also possible as an alternative to provide the two plate bodies of the respective storage plate in the form of a single, contiguous, one-piece plate, which is folded by 180° to prepare the storage plate. A fold will then extend along an edge of the storage plate.

An embodiment, in which at least two storage plates are formed by a continuous, i.e., contiguous, folded, one-piece web material, may be especially advantageous in this case.

A catalytic converter according to the present invention, which is suitable for use for an exhaust system of an internal combustion engine, especially of a motor vehicle, is equipped with a housing, which has an exhaust gas inlet and an exhaust gas outlet. Furthermore, a PCM device of the above-described type is arranged in the housing. It is possible now, in principle, to arrange at least one catalytic converter element in the housing in addition to the PCM device. It is additionally or alternatively possible to embody the desired catalytic converter effect by a correspondingly catalytically active coating of the PCM device in the area of the respective flow path. An especially compact, integral mode of construction is obtained hereby. The PCM device may be inserted with its side walls into the housing of the catalytic converter, which housing thus encloses the PCM device including the side walls thereof. It is possible as an alternative to integrate the PCM device in the housing of the catalytic converter such that the side walls of the PCM device form at least part of the side walls of the housing.

It is apparent that the above-mentioned features, which will also be explained below, may be used not only in the particular combination described, but in other combinations or alone as well, without going beyond the scope of the present invention.

Preferred exemplary embodiments of the present invention are shown in the drawings and will be explained in more detail in the following description, where identical reference numbers designate identical or similar or functional identical components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
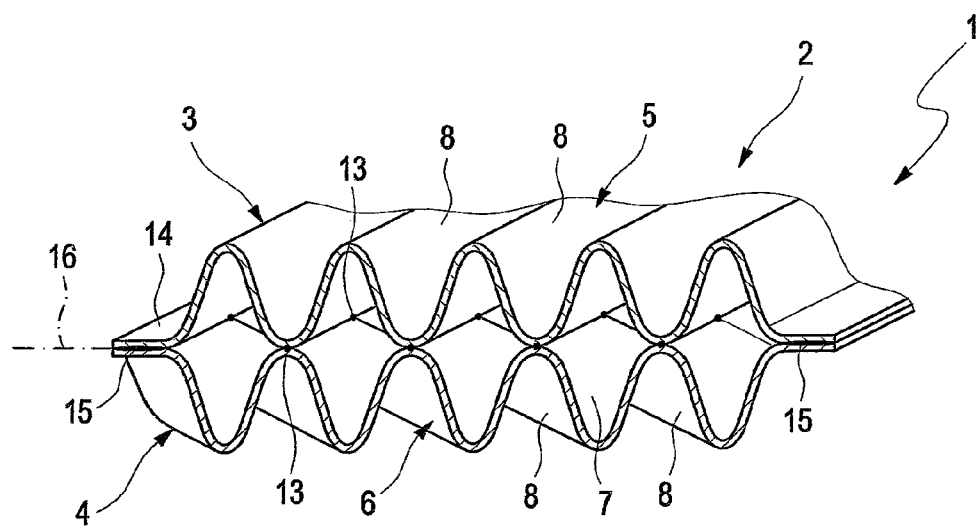
FIG. 1 is a simplified isometric view of a PCM device with a storage plate according to the invention.

Referring to the drawings in particular, a PCM device 1 is shown in FIG. 1, which is intended for use in an exhaust system of an internal combustion engine, especially of a motor vehicle. The PCM device 1 comprises at least one storage plate 2. Storage plate 2 has two plate bodies 3, 4, which lie one on top of another and have a wave structure 5, 6 each. The two plate bodies 3, 4 enclose between them a storage space 7. The plate bodies 3, 4 are coordinated with one another in terms of their wave structures 5, 6 such that wave structure 5 of one plate body 3 extends sloped in relation to the wave structure 6 of the other plate body 4. Due to the wave structures 5, 6 extending sloped in relation to one another (the wave structure 5 of one plate body 3 is at an angle with respect to the wave structure 6 of another adjacent plate body 4 and the angle is not zero), the storage space 7 has a fissured structure, as a result of which a contiguous, common storage space 7 is formed between the two plate bodies 3, 4. In particular, storage plate 2 thus has only a single, continuous storage space 7 in its interior. The complex structure of storage space 7 is obtained due to the wave troughs of the wave structures 5, 6 facing each other, which form half-ducts each that are open towards the respective other plate body 3, 4 and extend sloping in relation to one another corresponding to the wave structures 5, 6.

Figure 2:
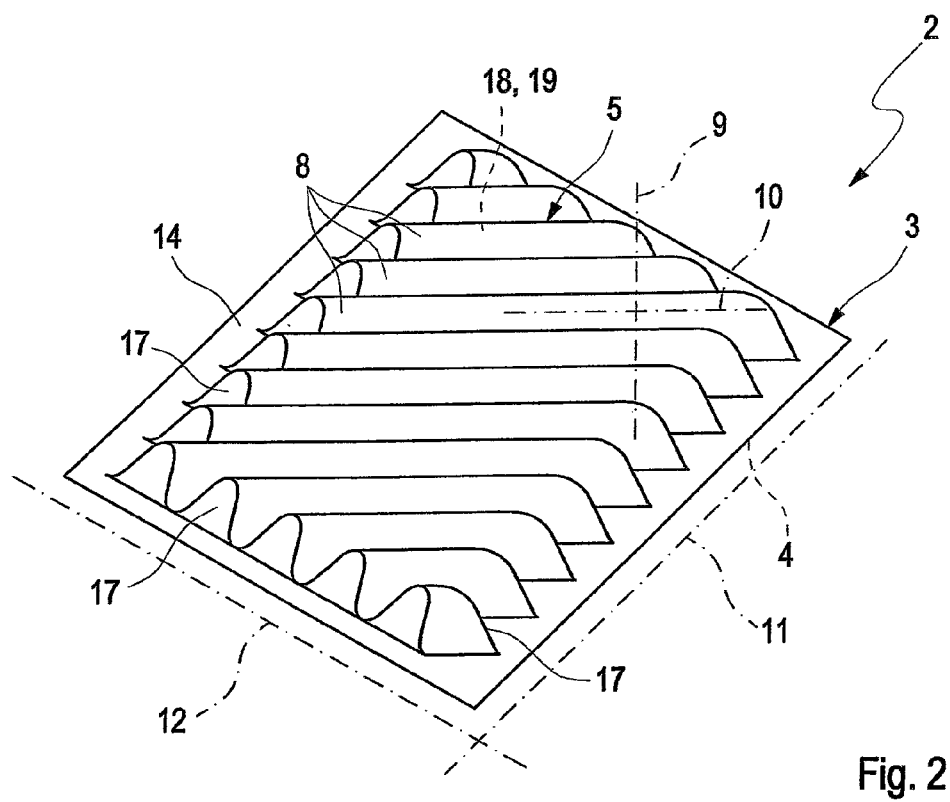
FIG. 2 is an isometric view of the storage plate.
Figure 3:
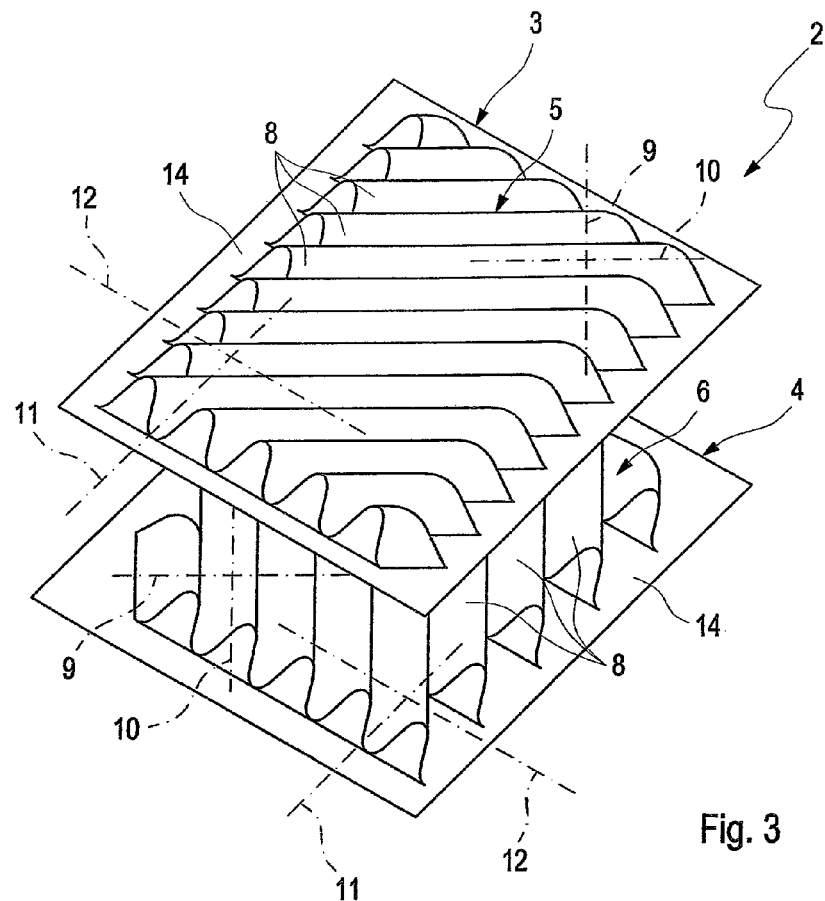
FIG. 3 is an isometric view of a storage plate in an exploded view.

According to FIGS. 2 and 3, the respective wave structure 5, 6 has a plurality of waves 8, which extend in parallel to one another and follow each other in a longitudinal direction 9 of the respective wave structure 5, 6 and extend in a transverse direction 10 of the respective wave structure 5, 6. The respective plate body 3, 4 has a rectangular shape in the example and correspondingly has a longitudinal direction 11 as well as a transverse direction 12. The corresponding longitudinal direction 9 and the corresponding transverse direction 10 extend at right angles to one another within the corresponding wave structure 5, 6. The corresponding longitudinal direction 11 and the corresponding transverse direction 12 extend at right angles to one another within the respective plate body 3, 4. The longitudinal direction 9 of the wave structure 5, 6 is sloped in relation to the longitudinal direction 11 of the respective plate body 3, 4 within the respective plate body 3, 4. This slope corresponds in the example to an angle of about 45°. Within the storage plate 1, the longitudinal directions 11 of the two plate bodies 3, 4 extend in parallel to one another. Contrary to this, the longitudinal directions 9 of the two wave structures 5, 6 within the storage plate 2 are sloped in opposite directions in relation to the longitudinal directions 11 of the plate bodies 3, 4. In the example being shown, the longitudinal direction 9 of one wave structure 5 in relation to the two longitudinal directions 11 of the plate bodies 3, 4 extends sloped (angled) by about +45°, whereas the longitudinal direction 9 of the other wave structure 6 extends sloped (angled) by −45° in relation to the longitudinal directions 11 of the two plate bodies 3, 4.

According to FIG. 1, the plate bodies 3, 4 have within the storage space 7 a plurality of contact sites 13, in which the plate bodies 3, 4 touch each other. The plate bodies 3, 4 may be fastened to each other in a plurality of or all such contact sites 13. The contact sites 13, 14 may correspondingly be soldered joints or welded joints.

It can be determined, besides, from FIGS. 1 through 3 that the respective storage plate 2 preferably has a closed circumferential edge 14, in which the plate bodies 3, 4 are flatly in contact with one another and are fastened to one another. A corresponding, closed, circumferential contact surface, which may be prepared by means of a soldered connection or a welded connection, is designated by 15 in FIG. 1. Storage plate 2 has a flat structure each in the embodiments being shown here, so that the aforementioned edge 14 is located in a contact plane 16, in which the edge-side contact takes place between the two plate bodies 3, 4. Furthermore, the shape of the plate bodies 3, 4 is selected in the embodiment being shown here to be such that the wave structures 5, 6 of the two plate bodies 3, 4 touch each other in said contact plane 16, so that the contact area 15 and the contact sites 13 are located in said contact plane 16. The wave structure 5 of one plate body 3 is located now, aside from the contact sites 13, on a side of the contact plane 6 facing away from the other plate body 4. This is correspondingly also true of wave structure 6 of the other plate body 4.

According to FIG. 2, longitudinal ends 17 of the individual waves 8 may come to a stop towards the edge 14.

Figure 4:
FIG. 4a is simplified sectional view of a plate body showing one of different embodiments.
FIG. 4b is simplified sectional view of a plate body showing another of different embodiments.
FIG. 4c is simplified sectional view of a plate body showing another of different embodiments.
FIG. 4d is simplified sectional view of a plate body showing another of different embodiments.
Figure 4:
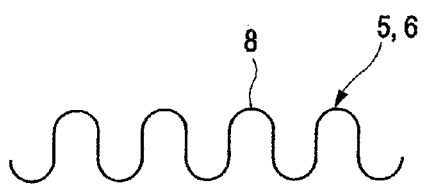
Figure 4:
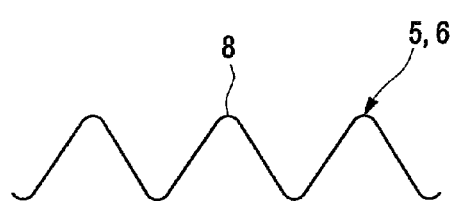
Figure 4:
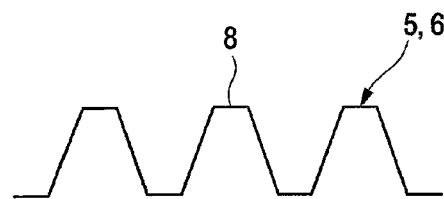

As can be determined from FIGS. 4a through 4d, the individual waves 8 or wave structures 5, 6 may have geometrically different cross sections. Thus, FIG. 4a shows a sinusoidal wave structure. FIG. 4b shows a circular arc-shaped wave structure. FIG. 4c shows a triangular wave structure and FIG. 4d shows a trapezoidal wave structure. It is clear that other cross sections or geometries may, in principle, be embodied for the respective wave structure 5, 6 as well.

Plate bodies 3, 4 are preferably made of a metal. They are especially sheet metal bodies.

Storage space 7 of PCM device 1 contains a heat storage material 18, which is preferably a phase change material, e.g., a salt or a salt mixture.

Figure 5:
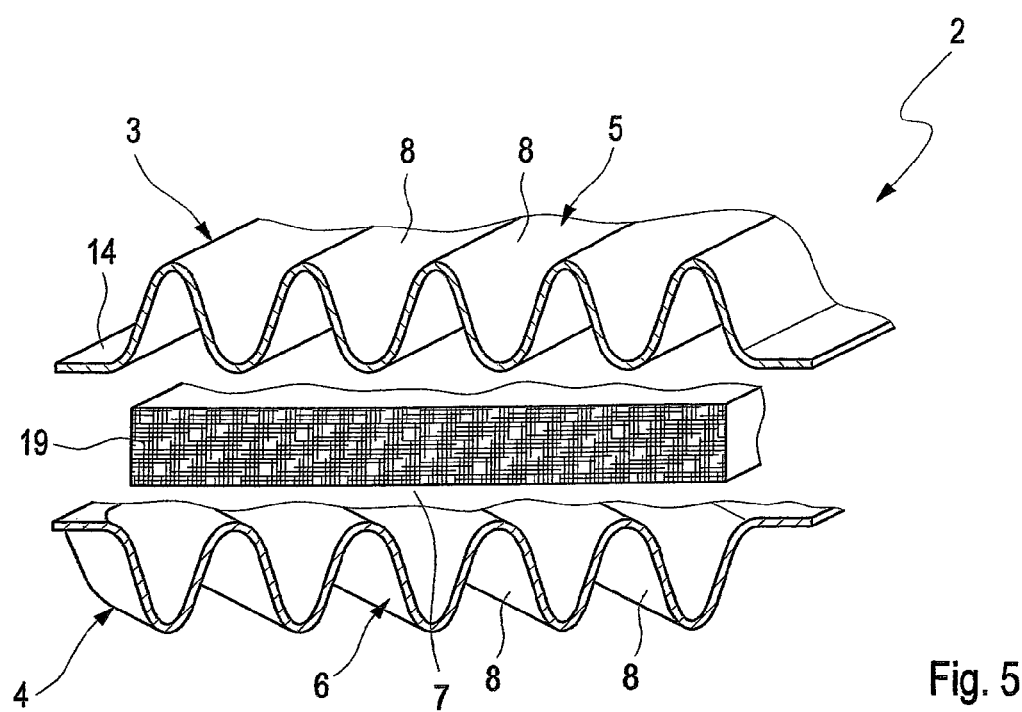
FIG. 5 is an isometric view of the storage plate in an exploded view for an embodiment with capillary structure.
Figure 6:
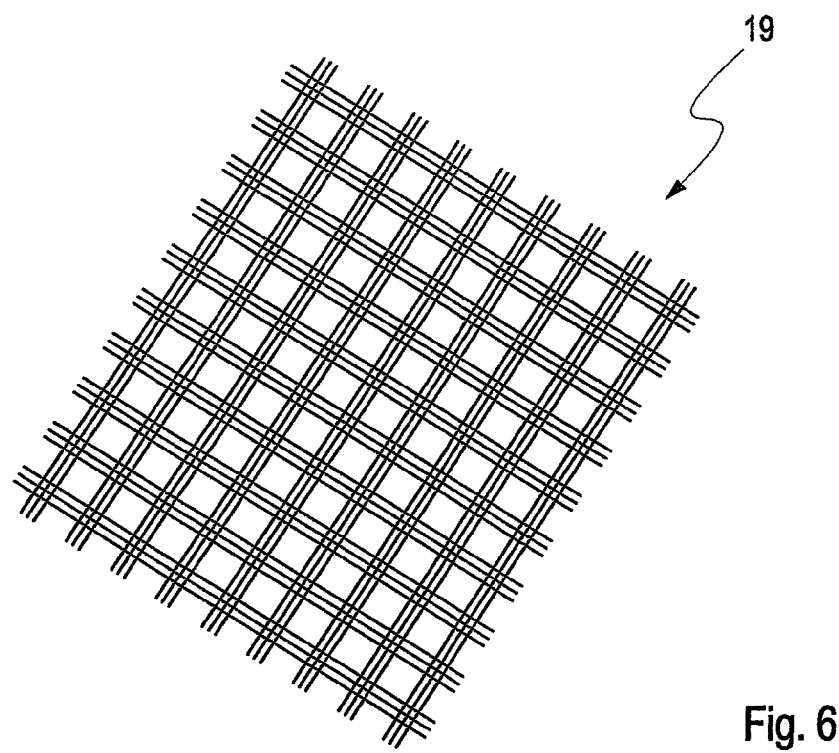
FIG. 6 is an isometric view of such a capillary structure.

Corresponding to FIGS. 5 and 6, a capillary structure 19 may be arranged in storage space 7. The capillary structure 19 extends along a plurality of waves 8 of the two wave structures 5, 6, which define the storage space 7. The capillary structure 19 is preferably dimensioned such that it extends through the entire storage space 7 and hence essentially over all waves 8 of the two wave structures 5, 6 within storage space 7. The two plate bodies 3, 4 may be fastened to each other in the contact sites 13 through the capillary structure 19. As an alternative, the capillary structure 19 may be laid such that the contact sites 13 in storage space 7 are left out. For example, the capillary structure 19 may have an open area, e.g., a mesh, in the area of the respective contact site 13. The capillary structure 19 may be, for example, a fibrous mat or a nonwoven mat or a network structure or a foam structure. Capillary structure 19 may consist of a metal or a ceramic. Capillary structure 19 is now designed or equipped such that it has capillary action in case of the liquid heat storage material. Capillary structure 19 thus causes the liquid heat storage material 18 to be distributed in essentially the entire storage space 7, regardless of the position of storage plate 2 in space. As a result, gaps or free spaces are formed due to the contracting heat storage material 18 during the solidification of the liquid phase in the entire storage medium 7. This is of considerable significance, because it is ensured hereby that the heat storage material 18 can expand into the gaps that are available during liquefaction, without excessive stresses developing in the storage plate 2 in the process.

Figure 7:
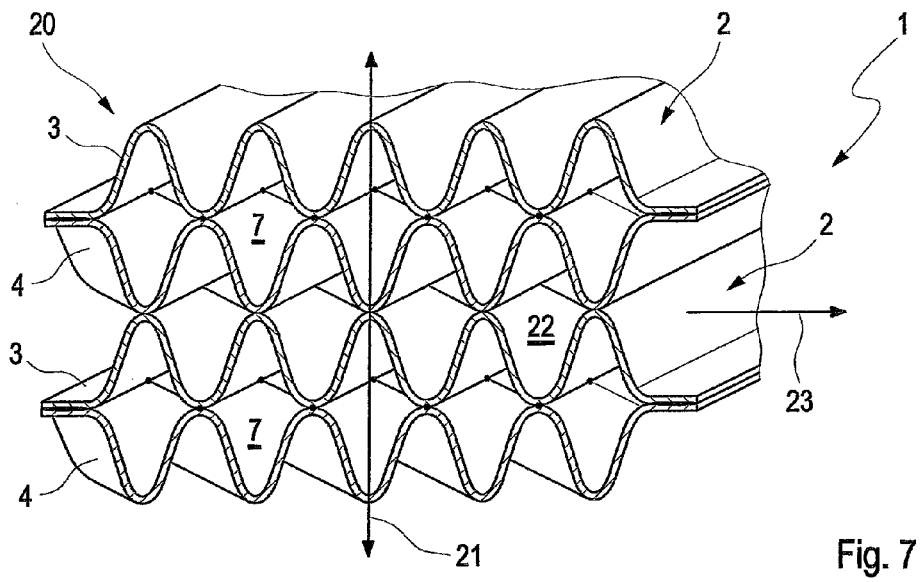
FIG. 7 is a simplified sectional view of a PCM device with a plate stack.
Figure 8:
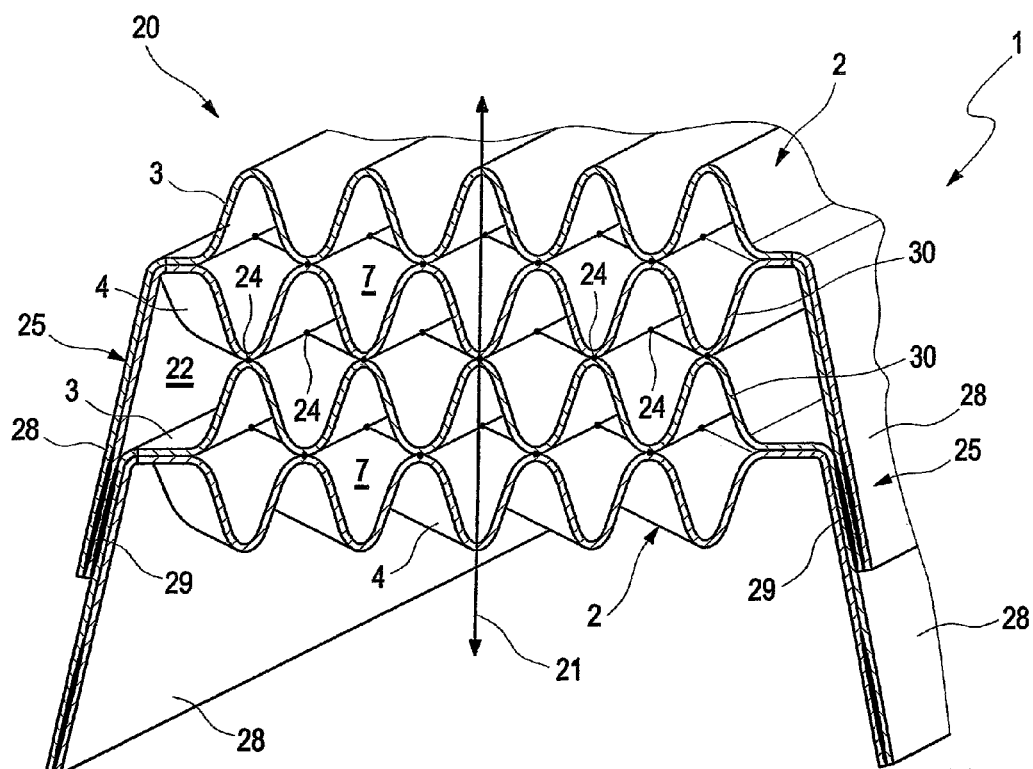
FIG. 8 is a sectional view of the PCM device with plate stack as in FIG. 7, but for another embodiment.

According to FIGS. 7 and 8, the PCM device 1 preferably comprises a plurality of storage plates 2. In a purely exemplary manner, two such storage plates 2 are shown in the example shown in FIGS. 7 and 8. It is clear that more than two storage plates 2 may be provided as well. The storage plates 2 are arranged one on top of another, so that they form a plate stack 20, whose stack direction 21 extends at right angles to the plate plane of the individual flat storage plates 2. A flow path 22, through which a fluid flow can be sent, is formed between adjacent storage plates 2. The fluid flow is preferably a gas flow, especially an exhaust gas flow. However, other fluid flows are also conceivable, in principle.

The wave structures 5, 6 of the plate bodies 3, 4, which laterally define the respective flow path 22 and correspondingly belong to adjacent storage plates 2, may extend sloped in relation to one another. A fissured structure can also be embodied in this manner for the flow path 22. Especially when using storage plates 2 of an identical design, the geometric structure of the respective storage space 7 may be essentially the same as the geometric structure of the flow path 22, but with the difference that the respective storage space 7 must be inevitably closed towards the outside in order to enclose the heat storage material, whereas the flow path 22 must be open in at least one direction of flow. FIG. 7 shows, purely as an example, a main flow direction 23 or longitudinal direction 23 of flow path 22, which preferably extends in parallel to the longitudinal directions 11 of the plate bodies 3, 4 of storage plates 2.

According to FIG. 8, the plate bodies 3, 4 of the adjacent storage plates 2 have, within the flow path 22, a plurality of contact sites 24, in which the plate bodies 3, 4 or the storage plates 22 are in contact with one another. Provision may also be made in this case for the storage plates 2, which are in contact with one another, to be fastened to one another in some contact sites 24 or in all these contact sites 24. The contact sites 24 may be soldered joints or welded joints.

According to FIG. 8, the respective flow path 22 may be laterally defined by side walls 25, which extend from an open inlet 26 (FIGS. 14 and 15) of the flow path 22 to an open outlet 27 (FIGS. 14 and 15) of the flow path 22 along the plate stack 20. FIG. 8 shows a special embodiment, in which the side walls 25 are formed by bent and mutually overlapping side edges 28 of the storage plates 2. Corresponding contact areas are designated by 29 in this case. Flat contacting is possible in these contact areas 29. At the same time, a gas-tight connection may be prepared in these contact areas 29, for example, as soldered joints or as a welded connection.

According to an especially advantageous embodiment, at least one of the plate bodies 3, 4 may have a catalytically active coating 30 on a surface facing away from the storage space 7, which said surface faces the flow path 22 in the plate stack 20. The PCM device 1 thus has an additional function, because it can act quasi as a catalytic converter element.

Figure 9:
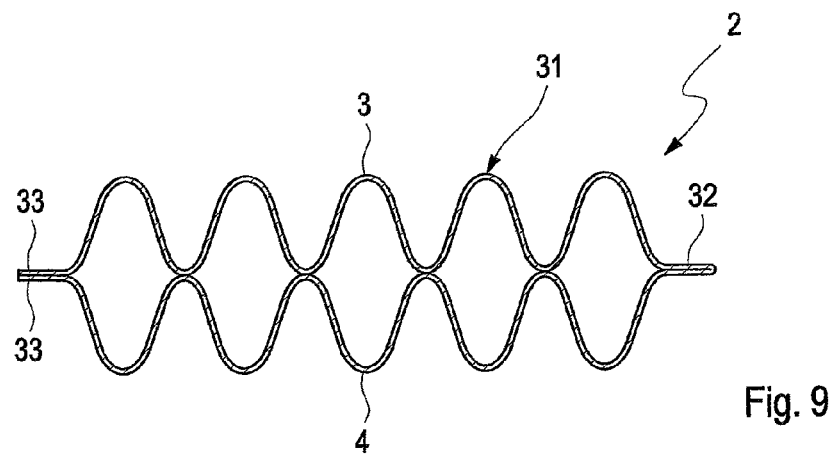
FIG. 9 is a simplified sectional view of a storage plate in a one-piece design.

FIG. 9 shows an embodiment of a storage plate 2, in which the two plate bodies 3, 4 are formed by a one-piece, contiguous plate 31, which is folded by 180° in the area of a fold 32, so that areas of the plate 31, which form the two plate bodies 3, 4, lie one on top of another. A corresponding fold is designated by 32, while longitudinal ends of the plates 31 are designated by 33. As an alternative to this, the plate bodies 3, 4 may also be separately manufactured components, which are built up on one another in order to form the respective storage plate 2. Identical parts are preferably used in this case, so that the two plate bodies 3, 4 are identical parts.

Figure 10:
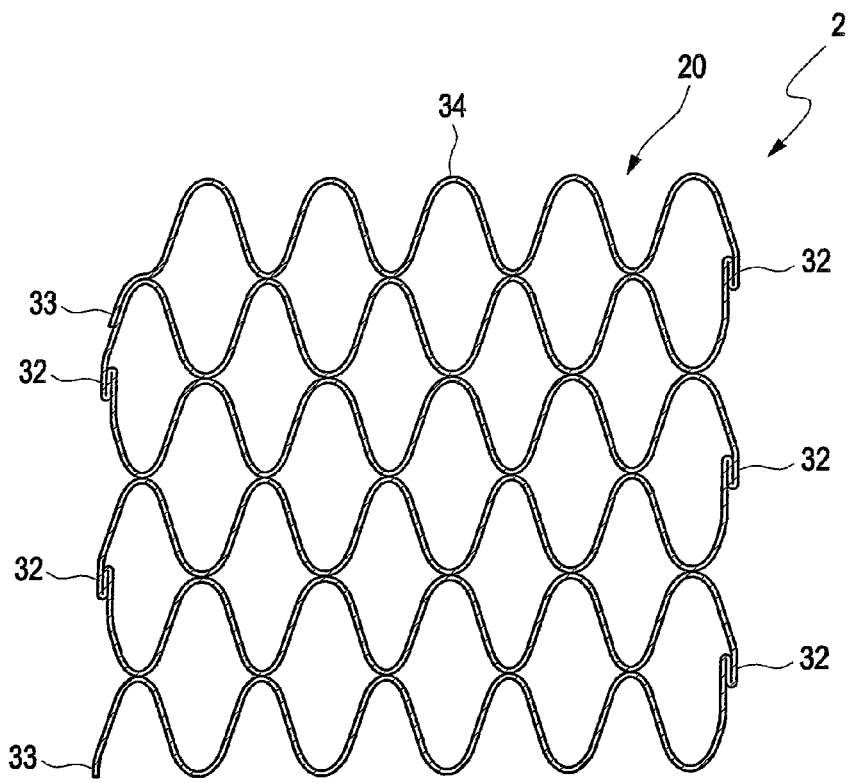
FIG. 10 is a simplified sectional view of a plate stack in a one-piece design.

FIG. 10 shows an embodiment in which a plate stack 20 is manufactured by means of a multiply folded, contiguous, one-piece web material 34. Corresponding folds are again designated by 32. The longitudinal ends of web material 34 are again designated by 33. As an alternative to this, plate stack 20 is preferably manufactured such that the individual storage plates 2 are manufactured first, and these are then stacked one on top of another.

Figure 11:
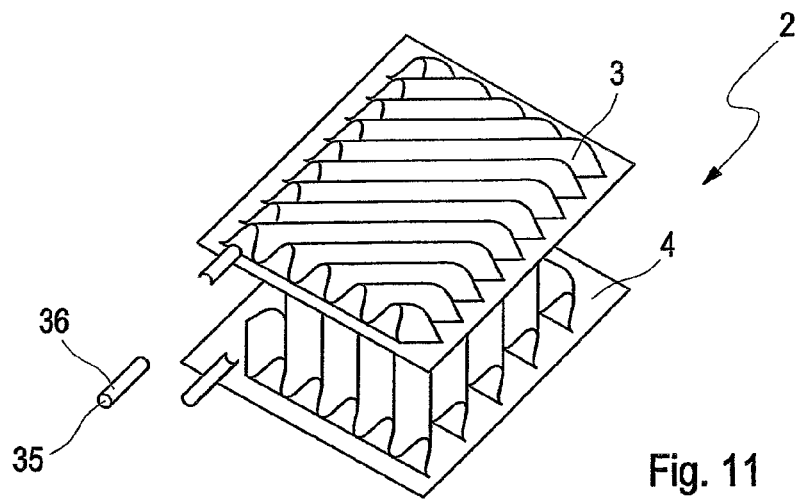
FIG. 11 is a simplified isometric exploded view of a storage plate with filling opening.
Figure 12:
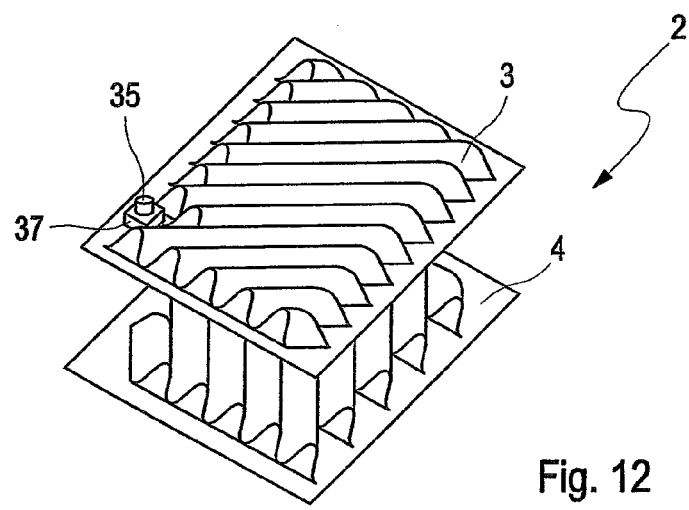
FIG. 12 is a view as in FIG. 11, but for another embodiment of the filling opening.
Figure 13:
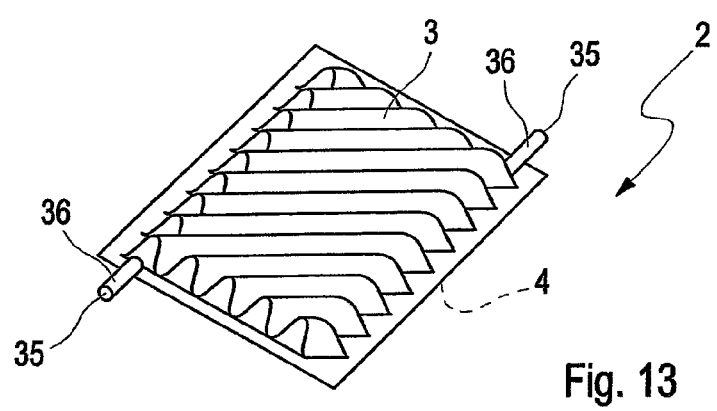
FIG. 13 is an isometric view of the storage plate with two filling openings.

According to FIGS. 11 through 13, the respective storage plate 2 may be provided with at least one filling opening 35, through which the heat storage material 18 can be filled into the storage space 7 after assembly of the plate bodies 3, 4. Since there is a contiguous, common storage space 7 within the storage plate 2, a single filling opening 35 is sufficient to fill storage space 7. Only one individual filling opening 35, through which, for example, the heat storage material 18 is filled in a solid state, in the form of a free-flowing granular material or powder, is shown in FIGS. 11 and 12. FIG. 11 shows an embodiment in which a tube section 36 is used to embody the filling opening 35. FIG. 12 shows an embodiment in which the filling opening 35 is formed by a corresponding bulge 37 integrally on at least one of the plate bodies 3, 4.

FIG. 13 shows an embodiment in which two filling openings 35 are provided, which are manufactured each with a tube section 36, one of which can be used for filling, while the other can be used for ventilation. It is possible as a result, for example, to fill the storage space with liquid heat storage material 18.

Figure 14:
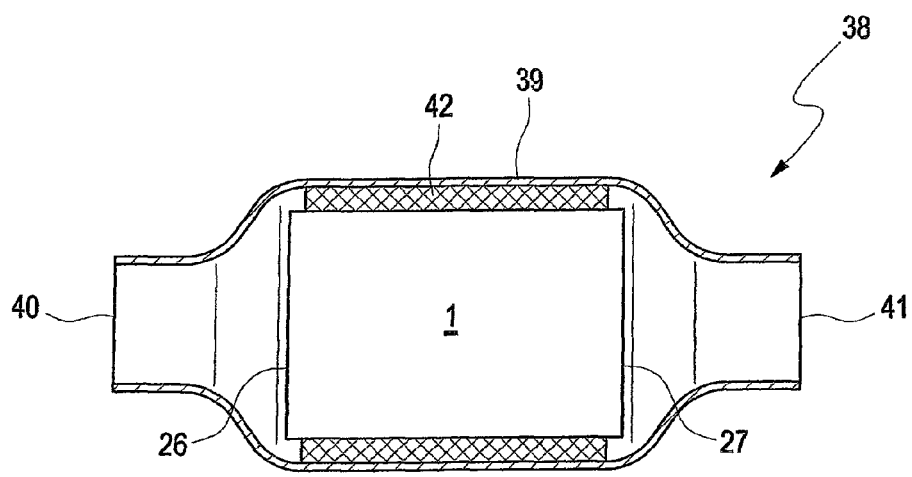
FIG. 14 is a simplified longitudinal section through a catalytic converter with built-in PCM device.
Figure 15:
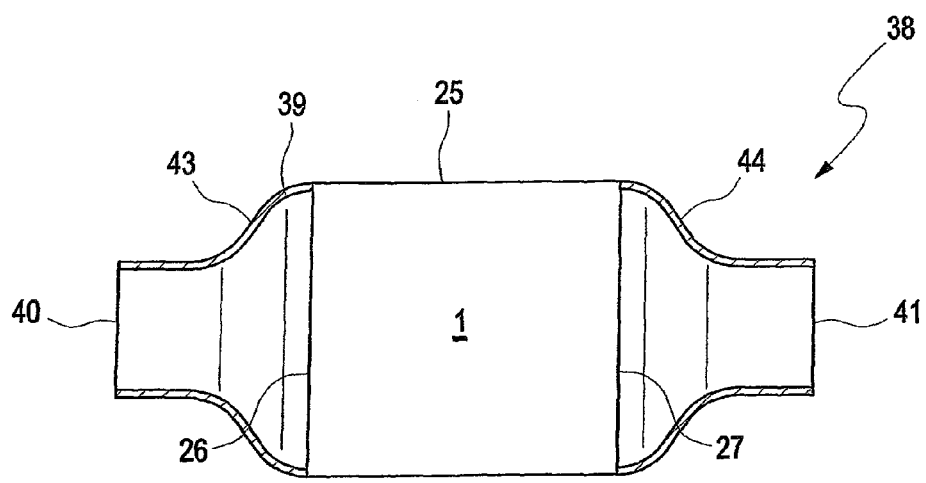
FIG. 15 is a simplified longitudinal section through a catalytic converter with integrated PCM device.

Corresponding to FIGS. 14 and 15, a catalytic converter 38, which is suitable for installation in an exhaust system of an internal combustion engine, especially of a motor vehicle, comprises a housing 39, which has an exhaust gas inlet 40 and an exhaust gas outlet 41. A PCM device 1 of the above-described type is arranged in housing 39. As is indicated in FIG. 14, PCM device 1 may be installed in housing 39 by means of a support material 42. Contrary to this, FIG. 15 shows an embodiment, in which at least part of housing 39 is formed by the side walls 25 of PCM device 1. In particular, the catalytic converter 38 according to FIG. 15 may be embodied by an inlet funnel 43 having the exhaust gas inlet 40 and an outlet funnel 44 having the exhaust gas outlet 41 being attached on the front side to the PCM device 1, so that the outer shell or jacket of the PCM device 1 will now form the housing 39 of the catalytic converter 38 together with the two funnels 43, 44.

A PCM device 1, which can be used as a catalytic converter element by means of a catalytically active coating 30 in the area of the respective flow path 22, is used in the embodiments of the catalytic converter 38 being shown here. It is clear that a design in which at least one conventional catalytic converter element may be arranged upstream and/or downstream of the PCM device 1 in housing 39 may also be embodied in another embodiment.

While specific embodiments of the invention have been shown and described in detail to illustrate the application of the principles of the invention, it will be understood that the invention may be embodied otherwise without departing from such principles.

What is claimed is:

1. A phase change material (PCM) device for an exhaust system of an internal combustion engine, the PCM device comprising:
    heat storage material;
    a storage plate comprising two plate bodies, which follow each other, enclose a storage space filled with said heat storage material and have a wave structure each, wherein said wave structure of a first of said two plate bodies extends sloped in relation to said wave structure of a second of said two plate bodies, said wave structure of said first of said two plate bodies and said wave structure of said second of said two plate bodies extending continuously, without interruption;
    another storage plate comprising two plate bodies, which follow each other, enclose a storage space filled with said heat storage material and have a wave structure each, wherein said wave structure of a first of said two plate bodies extends sloped in relation to a wave structure of a second of said two plate bodies, said another storage plate being arranged on top of said storage plate to form a plate stack, wherein a flow path is formed between adjacent storage plates, wherein said flow path is defined laterally by side walls, which extend from an open inlet of said flow path to an open outlet of said flow path along said plate stack.

2. A PCM device in accordance with claim 1, wherein the plate bodies within the storage space have a plurality of contact sites, in which bodies are in contact with one another, wherein the plate bodies are fastened to each other at a plurality of said contact sites.

3. A PCM device in accordance with claim 1, wherein wave structures of plate bodies of adjacent storage plates of said plate stack that form the flow path, extend sloped in relation to one another.

4. A PCM device in accordance with claim 1, wherein said side walls are formed by bent and mutually overlapping side edges of said storage plates.

5. A PCM device in accordance with claim 1, wherein at least one of said plate bodies has a catalytically active coating on a surface facing away from said storage space.

6. A PCM device in accordance with claim 1, further comprising a capillary structure, which extends along a plurality of waves of said wave structures of said two plate bodies, said capillary structure being arranged in said storage space of said storage plate.

7. A PCM device in accordance with claim 1, wherein said storage plate has a closed circumferential edge, in which said plate bodies are flatly in contact with one another and are fastened to each other.

8. A catalytic converter for an exhaust system of an internal combustion engine, the catalytic converter comprising:
    a housing with an exhaust gas inlet and an exhaust gas outlet; and a PCM device arranged in said housing, said PCM device comprising:
heat storage material;
a storage plate comprising two plate bodies, which follow each other, enclose a storage space filled with said heat storage material and have a wave structure each, wherein said wave structure of a first of said two plate bodies extends sloped in relation to said wave structure of a second of said two plate bodies, each of said wave structure of said first of said two plate bodies and said wave structure of said second of said two plate bodies defining a nonporous structure; and
another storage plate comprising two plate bodies, which follow each other, enclose a storage space filled with said heat storage material and have a wave structure each, wherein said wave structure of a first of said two plate bodies extends sloped in relation to a wave structure of a second of said two plate bodies, said another storage plate being arranged on top of said storage plate to form a plate stack, wherein a flow path is formed between adjacent storage plates, wherein wave structures of plate bodies of adjacent storage plates of said plate stack that form the flow path, extend sloped in relation to one another, wherein said flow path is defined laterally by side walls, which extend from an open inlet of said flow path to an open outlet of said flow path along said plate stack.

9. A catalytic converter in accordance with claim 8, wherein the plate bodies within the storage space have a plurality of contact sites, in which bodies are in contact with one another, wherein the plate bodies are fastened to each other at a plurality of said contact sites.

10. A catalytic converter in accordance with claim 8, wherein said side walls are formed by bent and mutually overlapping side edges of said storage plates.

11. A catalytic converter in accordance with claim 8, wherein at least one of said plate bodies has a catalytically active coating on a surface facing away from said storage space.

12. A catalytic converter in accordance with claim 8, further comprising a capillary structure, which extends along a plurality of waves of said wave structures of said two plate bodies, said capillary structure being arranged in said storage space of said storage plate.

13. A catalytic converter in accordance with claim 8, wherein said storage plate has a closed circumferential edge, in which said plate bodies are flatly in contact with one another and are fastened to each other.

14. A phase change material (PCM) device for an exhaust system of an internal combustion engine, the PCM device comprising:
heat storage material;
a storage plate comprising:
a first plate body with a wave structure having a wave structure direction;
a second plate body with a wave structure having a wave structure direction, said first plate body being disposed adjacent to said second plate body with the wave structure of said first plate body at an angle with respect to the wave structure of said second plate body with the angle not zero, said first plate body and said second plate body enclosing a storage space, said storage space receiving a flow of fluid, said first plate body and said second plate body being impermeable to said flow of fluid; and
a heat storage phase change material in said storage space; and
another storage plate, said another storage plate being arranged on top of said storage plate to form a plate stack, wherein a flow path is formed between said storage plate and said another storage plate, said flow path being defined laterally by side walls, which extend from an open inlet of said flow path to an open outlet of said flow path along said plate stack, said another storage plate comprising:
another plate body with a wave structure having a wave structure direction;
another second plate body with a wave structure having a wave structure direction, said another first plate body being disposed adjacent to said another second plate body with the wave structure of said another first plate body at an angle with respect to the wave structure of said another second plate body with the angle not zero, said another first plate body and said another second plate body enclosing a storage space; and
a heat storage phase change material in said storage space.

15. A PCM device in accordance with claim 14, wherein said first plate body and said second plate body each have, within the storage space, a plurality of contact sites, in which said first plate body and said second plate body are in contact with one another, wherein said first plate body and said second plate body are fastened to each other at said plurality of said contact sites.

* * * * *